United States Patent [19]

Ebeling

[11] Patent Number: 4,849,197

[45] Date of Patent: Jul. 18, 1989

[54] PROCESS FOR THE PREPARATION OF CALCIUM CYANAMIDE

[75] Inventor: Joachim Ebeling, Trostberg, Fed. Rep. of Germany

[73] Assignee: SKW Trostberg Aktiengesellschaft, Trostberg, Fed. Rep. of Germany

[21] Appl. No.: 156,725

[22] Filed: Feb. 16, 1988

[30] Foreign Application Priority Data

Feb. 18, 1987 [DE] Fed. Rep. of Germany ....... 3705049

[51] Int. Cl.$^4$ ................................................ C01C 3/16
[52] U.S. Cl. ................................................... 423/370
[58] Field of Search ....................................... 423/370

[56] References Cited

U.S. PATENT DOCUMENTS 1,006,927 10/1911 Frank .................................. 423/370
2,161,328 6/1939 Winter et al. ....................... 423/370

FOREIGN PATENT DOCUMENTS 352264 7/1931 United Kingdom ................ 423/370

Primary Examiner—John Doll
Assistant Examiner—Wayne A. Langel
Attorney, Agent, or Firm—Perman & Green

[57] ABSTRACT

A process for the preparation of calcium cyanamide by nitrification of calcium carbide composition in a rotary furnace. Ground carbide composition, composed of calcium carbide to which, if appropriate, calcium cyanamide and/or calcium fluoride have been added, is compacted to a density of from about 1.3 to 2.0 g/cm$^3$ before introduction to the rotary furnace. In this manner the severe caking on the rotary furnace wall which normally takes place in the course of nitrification is prevented and the nitrification yield is unexpectedly increased.

10 Claims, No Drawings

PROCESS FOR THE PREPARATION OF CALCIUM CYANAMIDE

BACKGROUND OF THE INVENTION

The present invention relates to a process for the preparation of calcium cyanamide by nitrifying calcium carbide in rotary furnaces.

The nitrification of technical calcium carbide in a rotary furnace with the addition of calcium cyanamide and small amounts of a calcium halide, such as, for example, calcium fluoride or calcium chloride, is well known. See, for example, Ullmann's Enzyklopadie der technischen Chemie ["Ullmann's Encyclopedia of Industrial Chemistry"], Volume 9 (1975) pages 85–95. In the Trostberg rotary furnace process which is used industrially, the calcium carbide, together with about 25–30% by weight of calcium cyanamide and 0.5–1% by weight of fluorspar, is about 90% ground to less than 0.09 mm in tube mills; the ground material formed is blown by means of nitrogen into an expanded rotary furnace port and is reacted with nitrogen at 1000°–1150° C. However, it is not possible to prevent severe caking of the reaction material on the walls of the rotary furnace following this procedure. A considerable manual effort is therefore required to scrape these cakings off the rotary furnace wall. This results in considerable expense relating to personnel and repairs, and appreciable losses in the nitrification yield also have to be accepted.

Attempts have been made to prevent severe caking by using a controlled narrow carbide grain size distribution of 0.075–3 mm (for which several comminution and screening stages are necessary), and by adding 1–2% by weight of calcium chloride, by graduated heat conductivity in the lining of the rotary furnace and by specially controlling the metering in of nitrogen using the Knapsack process. However, the process has not proved successful because of the considerable expense and also the calcium chloride content, which interferes with the subsequent production of calcium cyanamide derivatives.

The use of briquettes of finely ground carbide for nitrification has also already been suggested. This suggestion has also not found acceptance in the industry because of the additional expense required (the briquette press, transporting equipment for briquettes and intermediate storage for and screening of the briquettes) and because of the residual carbide which occurs in the interior of the briquettes as a consequence of excessively high densification (in order to achieve transportable briquettes resistant to breaking).

SUMMARY OF THE INVENTION

The present invention relates to a process for the preparation of calcium cyanamide by nitrifying calcium carbide in rotary furnaces which overcomes the mentioned disadvantages of the state of the art, and which makes it possible, without considerable industrial outlay, to prevent the severe caking which normally takes place on the rotary furnace wall during nitrification.

This has been achieved in accordance with the invention of introducing the ground carbide material, composed of calcium carbide to which, if appropriate, calcium cyanamide and/or calcium fluoride have been added, into the rotary furnace in a densified form. It has been found, surprisingly, that caking on the rotary furnace wall is substantially avoided by the present process and, in addition, the nitrification yield is increased by approximately 1%, due, inter alia, to the more uniform operation of the furnace, which could not have been foreseen.

In the process according to the present invention, the ground calcium carbide material is introduced in a densified form, directly into the rotary furnace, it being possible to vary the densification within relatively wide limits. It has proved particularly advantageous to adjust the density of the ground carbide material between about 1.3 to 2.0 $g/cm^3$ preferably 1.5–1.8 $g/cm^3$. This ensures that, although the ground carbide material is well densified, it is not too highly densified, which would result in the formation of residual carbide in the interior of the agglomerates and would have an adverse effect on the nitrification yield. The known devices, such as, for example, screw presses, extruders, ram presses or molding presses, are suitable for densifying the ground carbide material in an appropriate manner.

In a preferred embodiment, the ground carbide material is densified by means of lock-type ram presses, using the customary known devices comprising a dust catcher, a densification ram (with hydraulic or crank drive) and a densification tube (lock-type tube). In this regard for the ram pressure, for example as specified in German Offenlegungsschrift No.3,502,803. The lock-type tube can be slightly expanded in a cylindrical manner in the region of entry into the rotary furnace.

The finely ground carbide material is then transported via a silo into the transfer tube, densified by means of the ram and introduced into the rotary furnace port in the form of a ribbon consisting of densified ground material pieces. In the region of the forward furnace port the ribbon disintegrates into fragments as nitrification begins.

The ground carbide material densified in accordance with the invention, which is composed essentially of technical calcium carbide, can also contain added calcium cyanamide and/or calcium fluoride. The effect of the content of calcium cyanamide is to improve the grinding process, to dilute the calcium carbide, thereby preventing the formation of melting or sintering zones and to accelerate the nitrification process. The calcium cyanamide content of the densified ground material should, as a rule, not exceed 30% by weight, preferably 25% by weight. In a preferred embodiment, the amount of calcium cyanamide required to regulate the nitrification temperature is blown, entirely or partly in a finely divided form, into the rotary furnace, for example by means of nitrogen gas, during the nitrification process. This has the effect of providing the agglomerates and the wall of the rotary furnace with a fine coating of calcium cyanamide, as a result of which the risk of caking is reduced further. The calcium cyanamide for this purpose should be present in a finely divided form as a powder having a particle size of preferably less than 0.1 mm.

In addition to calcium cyanamide, the densified ground carbide material employed in the process according to the invention can also contain calcium fluoride, which is known to accelerate the nitrification reaction. The amount of calcium fluoride should not exceed 2% by weight, preferably 1% by weight, relative to the weight of calcium carbide.

The production of the ground carbide material employed in accordance with the invention is effected in a technically very simple manner by breaking and grinding calcium carbide to a particle size less than 0.1 mm, the further components calcium cyanamide and calcium fluoride being added, if appropriate, preferably before the grinding process and being ground together with the calcium carbide. This ground material is then fed directly to the densification unit and is compressed there.

The advantages of the process according to the invention are simultaneous metering and densification of the ground carbide material and a low tendency to caking in the nitrification mixture on the furnace walls, as a result of which it is possible to dispense with the rodding and blasting operations, which are in some cases very expensive. In addition, the nitrification yield is increased to above 93%, so that the profitability of the process is improved further. The following examples are intended to illustrate the invention in greater detail, but without limiting it thereto.

EXAMPLE 1

79.3 parts by weight of calcium carbide together with 20.0 parts by weight of calcium cyanamide and 0.7 part by weight of fluorspar were ground together until about 90% of the mixture had a particle size of less than 0.09 mm. The ground carbide material produced, containing 62.6% of $CaC_2$, was fed, at a rate of 1.75 tons per hour, to a lock-type ram press—equipped with a top dead center control—by means of which it was compressed to a density of 1.8 g/cm$^3$ and introduced guasi-continuously into the port of a cyanamide rotary furnace heated at 1050° C. At the same time 500-600 Nm$^3$ per hour of nitrogen were admitted to the rotary furnace. In addition, 0.1-0.4 ton per hour of calcium cyanamide dust, about 90% of which has a particle size of less than 0.1 mm, were blown into the furnace port in the region of the transfer tube by means of 50-100 Nm$^3$ per hour of nitrogen. The walls of the rotary furnace remained free from severe cakings of nitrificiation material and the interruptions of operation caused by cleaning were eliminated almost completely.

The calcium cyanamide produced had an N content of 24.95%. The nitrification yield was 93.7%. The content of unreacted residual carbide was 0.12% of $CaC_2$

EXAMPLE 2

84.5 parts by weight of calcium carbide, 14.9 parts by weight of calcium cyanamide and 0.6 part of weight fluorspar were ground together in a tube mill to form a mixture 95% of which has a particle size of less than 0.1 mm. The ground carbide material prepared in this way, containing 65.5% of $CaC_2$, was densified from 0.89 g/cm$^3$ to 1.65 g/cm$^3$ in a hydraulic lock-type ram press equipped with top dead center control, and injected into the port of a calcium cyanamide rotary furnace preheated to 1050° C. In addition, 0.2-0.6 ton per hour of calcium cyanamide dust, depending on the internal temperature, was blown in by means of 50-100 Nm$^3$ per hour of nitrogen, as well as 500-600 Nm$^3$ per hour of nitrification nitrogen. Mechanical cleaning of the rotary furnace walls was not necessary. The calcium cyanamide produced had a content of residual carbide of 0.05% of $CaC_2$ and an N content of 24.55%. The nitrification yield was 93.3%.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

I claim:

1. A process for the preparation of calcium cyanamide in high yield by nitrifying calcium carbide in a rotary furnace while preventing severe caking of the calcium carbide on the furnace walls during nitrification, which comprises introducing ground calcium carbide composition into the furnace in the form of a densified mass having a density of from about 1.3 g/cm$^3$ up to about 2.0 g/cm$^3$.

2. The process according to claim 1 wherein the density of the compacted ground carbide composition is from about 1.5 to 1.8 g/cm$^3$.

3. The process according to claim 1 wherein the ground carbide composition is densified by means of a lock type ram press.

4. The process according to claim 1 wherein the ground calcium carbide composition contains up to 30% by weight of calcium cyanamide.

5. The process according to claim 1 wherein calcium cyanamide in a finely divided form is additionally blown into the rotary furnace during the nitrifying process.

6. The process according to claim 5 wherein the particle size of the calcium cyanamide blown in is less than 0.1 mm.

7. The process according to claim 1 wherein the ground calcium carbide composition contains up to 2% by weight, of calcium fluoride.

8. The process according to claim 1 in which the densified mass of calcium carbide composition comprises a ribbon, consisting of densified ground material pieces; which is introduced semi-continuously to the rotary furnace.

9. The process according to claim 1 wherein the ground calcium composition contains up to 25% by weight of calcium cyanamide.

10. The process according to claim 1 wherein the ground calcium composition contains up to 1% by weight of calcium fluoride.

* * * * *